EQUALIZING AND CONTROL VALVE

Original Filed Dec. 22, 1950 3 Sheets-Sheet 1

Leslie H. Comstock
INVENTOR.

BY James H. Wiler

ATTORNEY

EQUALIZING AND CONTROL VALVE

Original Filed Dec. 22, 1950 3 Sheets-Sheet 2

Leslie H. Comstock
INVENTOR.

BY James H. Weiler

ATTORNEY

EQUALIZING AND CONTROL VALVE

Original Filed Dec. 22, 1950 3 Sheets-Sheet 3

Leslie H. Comstock
INVENTOR.

BY James H. Wilder

ATTORNEY

United States Patent Office

Re. 24,352
Reissued Aug. 27, 1957

24,352

EQUALIZING AND CONTROL VALVE

Leslie H. Comstock, Houston, Tex.

Original No. 2,690,226, dated September 28, 1954, Serial No. 202,260, December 22, 1950. Application for reissue April 3, 1956, Serial No. 575,920

13 Claims. (Cl. 166—145)

Figure 1:
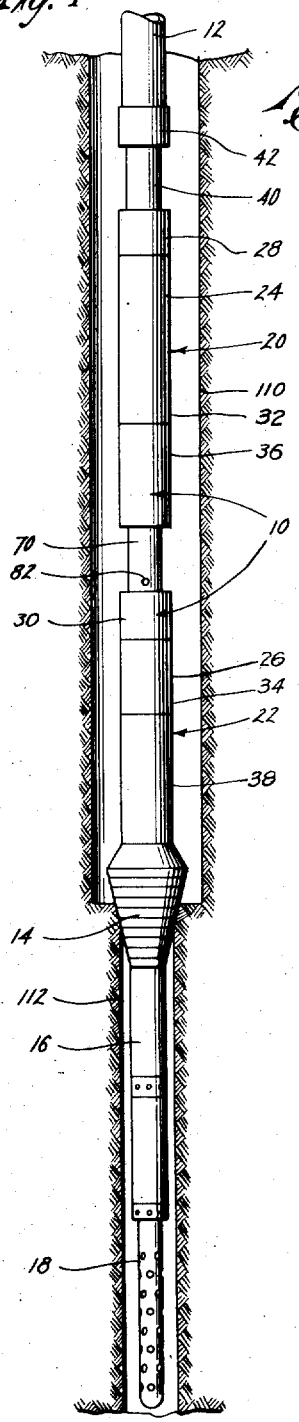

Matter enclosed in heavy brackets [ ] appears in the original patent but forms no part of this reissue specification; matter printed in italics indicates the additions made by reissue.

This invention relates to equalizing and control valves and more particularly to a valve arrangement suitable for use in drill pipe or the like in oil wells.

In the drilling of oil wells and the like it is customary to seal off a potential producing formation in order to obtain a sample of the fluid of the formation and to obtain a "shut-in" or "closed-in" pressure reading of the formation. Conventionally, a packer or packing means is set above the potential producing formation to pack off the upper end of the bore hole to prevent hydrostatic fluid from above entering the formation or the testing means employed.

In the testing of such formations it is often difficult to equalize the pressure above and below the packer in order to free the packer and to provide valve means which assure the operator of obtaining the closed pressure of the formation being tested.

It is an object of the present invention to provide a suitable valve arrangement which may be operated by manipulation of the drill stem or conduit to which it is connected and which is capable of performing various functions, such as, relieving the pressure beneath the packer when it is being placed in position, enabling a test sample of the particular formation being tested to be obtained and providing a valve closure in order that the closed in pressure of the formation may be obtained prior to equalizing the pressure above and below the packer.

It is a particular object of the present invention to provide a valve assembly which will equalize the pressure above and below the packer but yet will provide a closure prior to equalizing the pressure after the sample has been obtained in order that a closed formation pressure may be obtained.

It is yet a further object and feature of the present invention to provide a valve assembly which has a time lag between the closing of the valve adapted to permit formation fluid to flow into the sample receiving chamber or conduit and the opening of the equalizing valve whereby a shut-in pressure of the formation being tested is automatically obtained.

It is yet a further object of the present invention to provide a control and equalizing valve assembly which is simple and rugged in use and which omits many of the elements of conventional valves now in use.

A feature of the invention is the provision of a control valve which opens only after the tool has been set thereby preventing drill fluid from entering the sample conduit or chamber and thereby eliminating the usual disc valve for this purpose.

A further feature is the provision of automatic jarring means to aid in unseating packing elements used in oil well testing and the like.

Other and further objects and advantages reside in certain novel features of the arrangement and construction of parts as will be apparent from the following description taken in connection with the accompanying drawing, in which—

Figure 2:
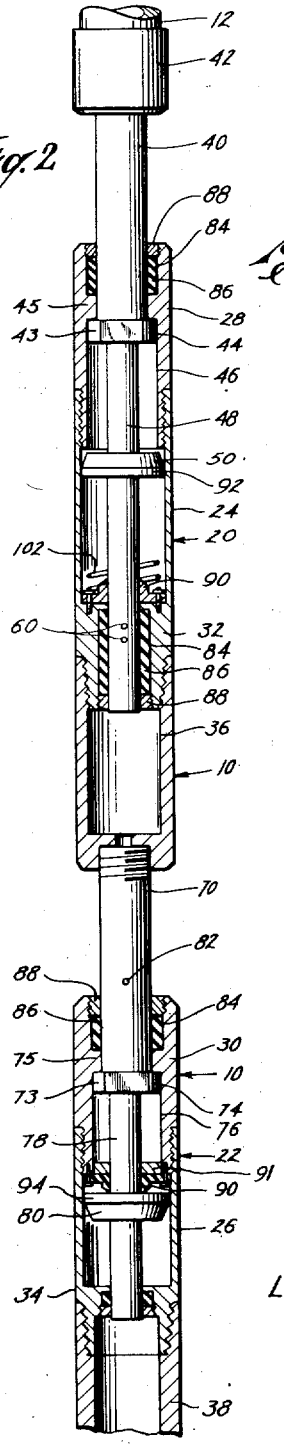
Figure 3:
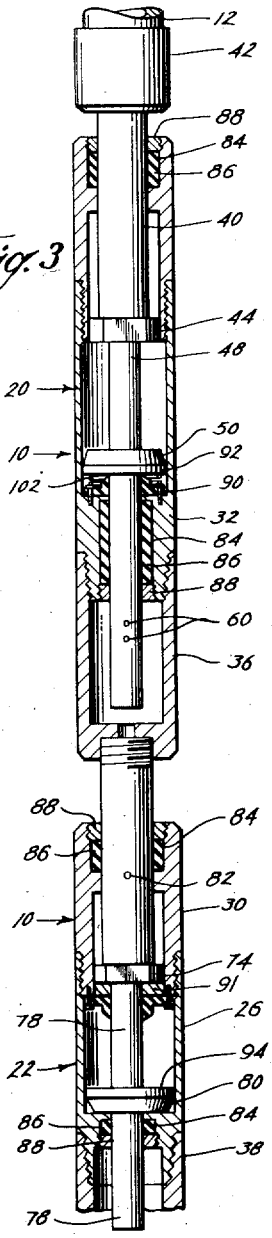
Figure 4:
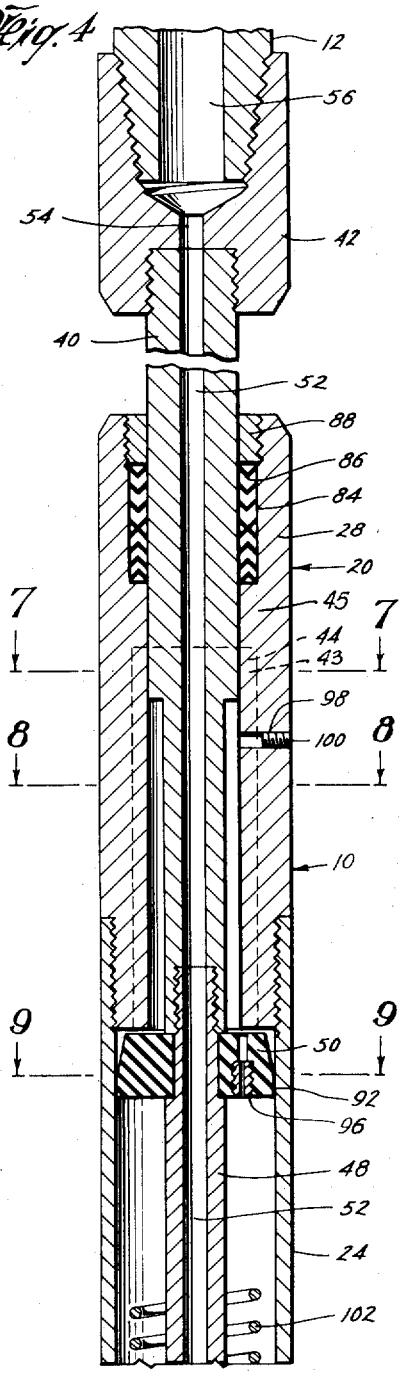
Figure 5:
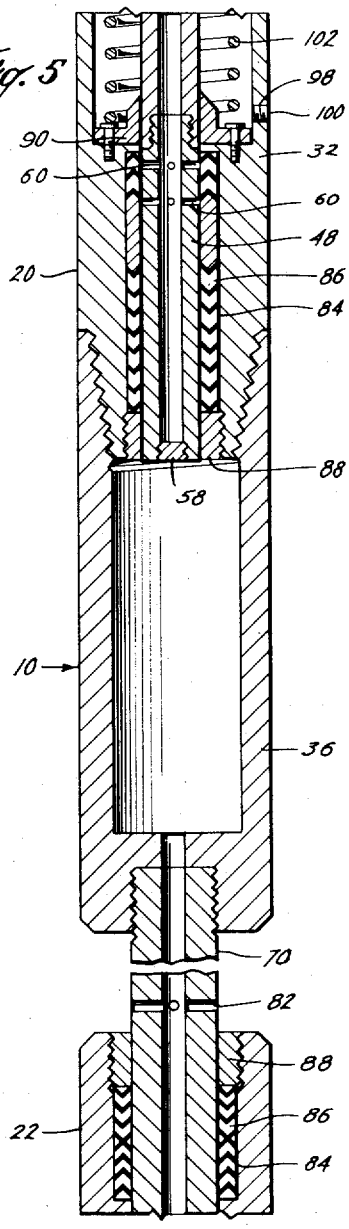
Figure 6:
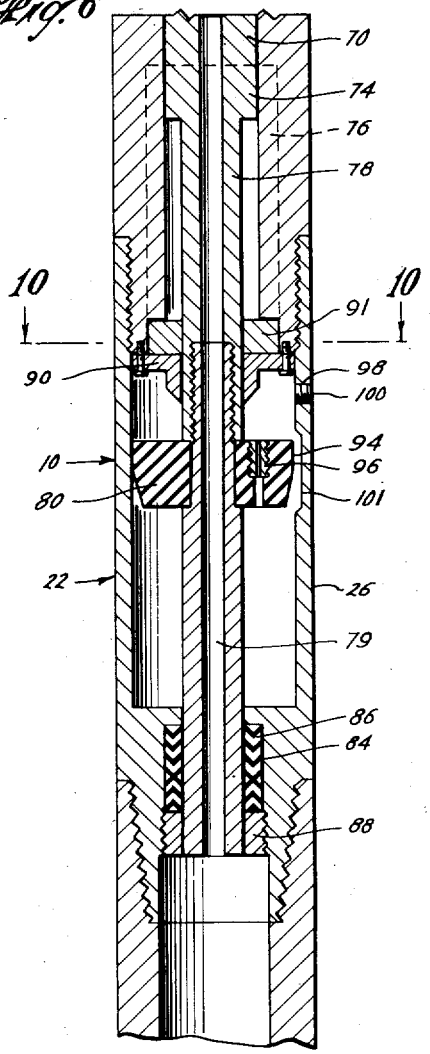
Figure 8:
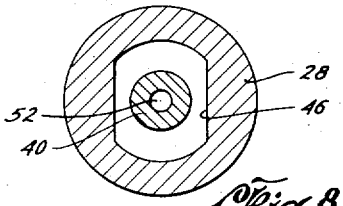
Figure 9:
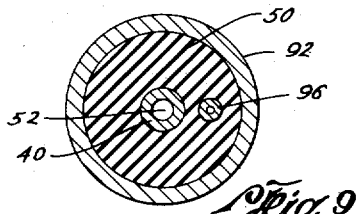
Figure 10:
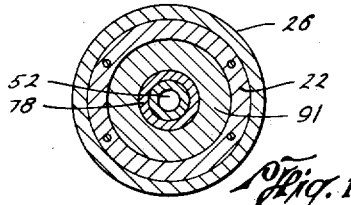
Figure 11:
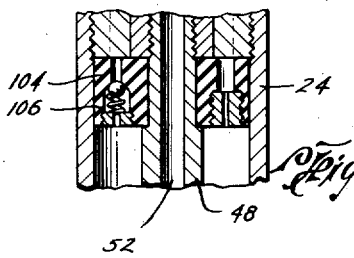
Figure 7:
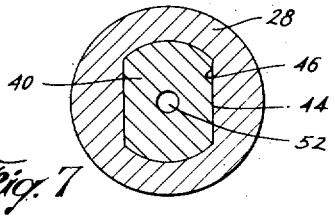

Fig. 1 is a view in side elevation of apparatus illustrating the principles of the invention, the arrangement illustrating equalizing and control valves in connection with a typical formation tester assembly, Fig. 2 is a side view, partially in section, illustrating the equalizing and control valves as the device is lowered into a well bore, Fig. 3 is similar to Fig. 2 but illustrates the valve assembly in position for taking sample fluid from the formation being tested, Figs. 4, 5 and 6 are enlarged side elevations in section better illustrating the embodiment of Fig. 2 and Figs. 7–10, inclusive, are cross-sectional views taken along corresponding section lines of Figs. 4 and 6, and Fig. 11 illustrates a modification of valve means which may be utilized in the valve assembly.

Referring now to the drawings, where like character references designate like parts throughout the several views, and particularly to Fig. 1, the assembly there shown includes the equalizing and control valve assembly 10, secured at its upper end to the string of pipe 12 extending up to the surface (not shown), and connected at its lower end to a typical "rat-hole" packer 14, which in turn is secured to a conventional pressure recording device 16 and a perforated section of pipe 18 by which sample fluid from the formation being tested may be obtained.

The assembly indicated is typical and is illustrated for the purpose of disclosure. Any type of conventional packer or packing means may be utilized, such as a "hook-wall" packer and any conventional pressure recording means may be utilized. For example, a pressure recording device illustrated in Patent No. 2,078,623, issued April 27, 1937, to H. D. Wilde, Jr., may be used and the formation tester may be such as that disclosed in the U. S. patent to Moore, No. 2,189,919, dated February 13, 1940, entitled "Method and Apparatus for Formation Pressure Testing." Manifestly, the formation tester and packing assembly may be of any known type.

Referring now more particularly to my novel equalizing and control valve assembly, and with particular reference to Figs. 2, 4, 5 and 6 the valve assembly is made up of two major elements, an upper valve element 20 and a lower valve element 22. The upper 20 and lower 22 valve elements each include tubular piston chambers 24 and 26 respectively, which are closed at their upper ends by the submembers 28 and 30, respectively, and are closed at their lower ends by the closure members 32 and 34, respectively. As illustrated, these elements may be threadedly secured together in the usual and customary manner.

Threadedly secured to the lower ends of the closure members 32 and 34 of the piston chambers 24 and 26 are the tubular runout chambers 36 and 38, respectively. The function of these runout chambers will be apparent later.

In order that the valve assembly might be manipulated from the surface by means of the string of pipe 12, a mandrel 40 is threadedly secured at its upper end to the coupling 42, which in turn is threadedly secured to the string of pipe 12 in the customary manner. At the lower end of the mandrel 40 the keys 44 are provided to move in the keyways 46 of the upper tubular element 28 of the upper valve element 20. The keys 44 are defined by the flattened sides of the enlargement 43 which stops against the inwardly projecting circumferential flange 45 of the upper submember 28. Immediately below the keys or splines 44 the mandrel 40 is turned down, as indicated by the numeral 48 and has secured thereto the piston 50, the mandrel extending therebelow through the upper piston chamber 24 and into the closure member 32. As better seen in Figs. 4 and 5, the mandrel 40 and its turned down portion 48 are provided with a central passage 52 therethrough which is in communication with the passage 54 of the coupling 42 which in turn is in communication with the interior passage 56 of the string of pipe 12. The lower end of the turned down portion 48 of the mandrel 40 is closed by the threaded plug 58 and disposed proximate the lower end thereof are the lateral ports 60 which are in communication with the central passage 52 of the turned down portion 48 of the mandrel 40.

The lower valve element 22 is similar to the upper valve element 20 and has the upper end of the mandrel 70, which extends from the upper end of lower valve element 22, threadedly secured to the lower portion of the runout chamber 36. The mandrel 70 is substantially identical to the mandrel 40 and has the keys 74 slidable in the keyways 76 of the upper submember 30 of the lower valve element 22 and has the turned down portion 78 immediately therebelow extending substantially through the lower valve element 22. The keys 74 are defined by the flattened sides of the enlargement 73 which stops against the inwardly projecting circumferential flange 75 of the lower sub 30. A piston 80 is secured to the turned down portion 78 of the mandrel 70 and the turned-down portion 78 continues and is adapted to move into the runout chamber 38. Thus the mandrel 70 and its continuation 78 is slidable through the lower valve element; however, the lateral ports 82 provided in the mandrel 70 are open to the well bore when the tool is being lowered into or raised from testing position.

As better illustrated in Fig. 6, the lower end of the turned down portion 78 of the mandrel 70, here illustrated as an additional threaded member to the lower end of the mandrel 70, is not plugged, but is open and fluid may circulate through the lateral ports 82 out through the apertures in the section of pipe 18 in order that drill fluid may circulate past the packer and formation testing means. Thus, a swabbing action is avoided and the pressure above and below the packer is equalized.

The upper ends of submembers 28 and 30, and the lower ends of the closure members 32 and 34 are counterbored, all as indicated by the numeral 84 and conventional packing 86 and a gland ring 88 are utilized to provide an effective seal for these members, which comprise in effect stuffing boxes. The stuffing boxes illustrated are all substantially the same except that the stuffing box in the lower end of the closure member 32 is extended with respect to the others. This is best seen in Fig. 5 and the extended stuffing box is provided in connection with the lateral ports 60 for a purpose which will be apparent later. Packing is provided at the lower ends of the piston chambers 24 and 26, the packing here illustrated as C-cups 90. It is noted that the C-cup 90 disposed at the lower end of the piston chamber 24 extends upwardly and the C-cup 90 disposed at the upper end of the lower piston chamber 26 extends downwardly. These C-cups are positioned in this manner inasmuch as the valve action in the upper and lower chamber is reversed. A junk ring 91 may be provided in connection with the lower C-cup to provide the required support for the cup.

Referring now more particularly to the pistons 50 and 80 positioned in the piston chambers 24 and 26, these pistons are formed of resilient material or rubber and the piston 50 is downwardly and outwardly diverging and terminates in a substantially circumferential head 92. The lower piston 80 is upwardly and outwardly diverging and terminates in the upwardly facing circumferential head 94. Each piston is drilled and tapped and has the removable orifices or chokes 96 threaded in their heads. Each piston chamber is drilled and tapped, as at 98 in order that the chambers may be provided with hydraulic oil or fluid, the threaded openings 98 normally being closed by the threaded plugs 100. Thus, as the upper piston 50 moves downwardly its downward movement will be relatively slow inasmuch as the rubber piston is expanded against the piston chamber walls; whereas, when it moves upwardly its upward movement will be fast in relation to its downward movement inasmuch as the rubber piston is compressed because it diverges downwardly and outwardly. In order to insure a fast initial upward movement, the compression spring 102 is disposed in the lower end of the upper piston chamber 24. The movement of the lower piston 80 is the reverse of the movement of the upper piston 50. Thus the downward movement of the lower piston 80 will be fast with respect to the upward movement of this piston. For reasons which will be apparent later, a plurality of vertical grooves or recesses 101 to permit the bypassing of hydraulic fluid is disposed near the upper end of the lower piston chamber 26.

As illustrated in Fig. 11, as an alternative embodiment, a piston 104 may be employed in lieu of the tapered pistons illustrated. The piston 104 is illustrated with the check valve assembly 106 and, in the event such a valve is used, the upper valve would have the check valve as illustrated in Fig. 11 and, the lower valve would have the check valve in an inverted position to that of the piston illustrated in Fig. 11. In other words, any suitable valve means may be utilized which will provide a relatively slow downward movement with respect to the upward movement of the upper valve 50, and a relatively fast downward movement with respect to the upward movement of the lower valve 80. It is essential, in order to obtain a closed in pressure reading of a formation, to close the control valve and thereafter open the equalizing valve.

To seat and remove a packer and obtain a sample of the formation fluid and the shut-in or closed-in pressure of the formation with the apparatus just described, the operation may be as follows:

The assembly may be lowered into the well bore 110 as illustrated in Fig. 1. In lowering the apparatus into the well bore the elements of the valve assembly will be in the position indicated in Figs. 2, 4, 5 and 6. That is, upper and lower valve elements 20 and 22, respectively, will be hanging or suspended from the mandrels 40 and 70 by means of the enlargements 43 and 73 engaging the flanges 45 and 75 at the upper ends of the sub members 28 and 30. Thus, the ports 60 will be in the upper end of the packing 86 and the ports 82 will be in communication with the hydrostatic pressure of the well fluid in the well bore 110. Thus as the apparatus is lowered into the well bore, the drill fluid may circulate through the apertures in the section of pipe 18 through a passage in the tester and packer on up through the central passage in the turned-down portion 78 and the lower mandrel 70, out through the apertures 82 in the formation. Thus a swabbing action is prevented and the apparatus may be lowered readily into a well bore having drill fluid therein.

In the event an obstruction is encountered in lowering the assembly into the well bore, the upper valve element 20 will not be prematurely opened in view of the slow downward movement of the piston 50 in the upper piston chamber 24. This prevents contaminating fluid from entering the sampling string of pipe 12. I have found that a time lag of about four or five minutes between the closing of the lower valve element and the opening of the upper valve element is satisfactory, although other periods of lag may be provided as desired. By this construction the ordinary disc valve is omitted.

Assuming now that the arrangement is lowered to the desired position at which a test is to be taken and, as illustrated in Fig. 1, the rat-hole packer 14 has entered and is seating on the upper portion of the rat-hole 112, the downward movement of the assembly will be stopped. In pressing the packer into position in the rat-hole, downward force will be transmitted by means of the string of pipe 12 downwardly through the mandrel 40 and the mandrel 70.

As indicated heretofore, the downward travel of the piston 50 will be relatively slow and its downward travel will be metered by the hydraulic fluid passing through the removable orifice or choke 96. The downward travel of the mandrel 70 will be relatively fast and the ports 82 will rapidly move into the packing 86 thereby closing the assembly 10 with respect to hydrostatic pressure above the packer 14. Thus there is a time lag between the movements of the mandrels 40 and 70 thereby permitting the packer to be set in sealing engagement with the walls of the rat-hole before the ports 60 move into the runout chamber 36.

When the valve assembly is in formation testing position, the elements will be in the position illustrated in Fig. 3. Thus, both pistons 50 and 80 will have moved downwardly through their stroke and the apertures 82 will have moved quickly into the packing 86. Subsequently, the apertures 60 will move down out of the packing 86 into the runout chamber 36 at the lower end of the upper valve element 20 of the valve assembly. Thus, a sample of the formation fluid is permitted to enter the apertures of the perforated section 18 and flow up through the pressure recording means and packer into the central passage 79 in the turned-down portion 78 and the mandrel 70, thence into the runout chamber 36, through the apertures 60 and into the central passage 52 of the upper mandrel 40, through the passage 54 in the coupling 42 and on up into the interior passage 56 of the string of manipulating pipe 12.

After the desired sample of the formation fluid has been obtained and it is desired to release the packer, a simple upward pull on the manipulating string of pipe 12 will raise the mandrels 40 and 70 and the pistons 50 and 80 connected thereto. Due to the upwardly and inwardly tapering piston head 50, the upper piston will move upwardly rapidly thereby rapidly moving the ports 60 into the packing or packed off area 86 of the closure member 32 of the piston chamber 24. To assure a fast initial upward movement of piston 50, the compression spring 102 has been provided. The upward movement of the lower piston 80 will be much slower than the upward movement of the upper piston 50, and the upward movement of the lower piston 80 will be metered by the removable orifice or choke 96 positioned therein. Thus the ports 82 will be delayed from moving out of the packing 86 in the upper portion of the upper sub member 30 of the lower piston chamber 26 and, inasmuch as the lower end of the turned-down portion 48 of the mandrel 40 is plugged, as indicated at 58, the lower valve element 22 remains closed and a shut-in or closed in pressure of the formation may be obtained by the pressure recorder 16. Inasmuch as the upward movement of the piston 80 is measured by the rate of flow of hydraulic fluid through the removable orifice or choke 96, any desired time lag may be obtained by utilizing any desired size of choke. Several minutes time lag has been found to be satisfactory in use, however, in order to obtain a shut-in pressure. Thus, the travel of the lower piston 80 is metered by the measured escape of hydraulic oil from the top of the piston chamber 26 to the bottom through the orifice 96 and, when the piston 80 reaches the by-pass grooves 101, the upward movement of the piston is greatly accelerated, and provides a jarring action to aid in releasing the packer. Preferably, the jarring takes place after the pressure is equalized below and above the packer, and manifestly, more pull on the manipulating string will result in a greater jarring action. When the ports 82 have moved upwardly out of the packing 86, the pressure above and below the packer 14 is equalized and further upward movement of the manipulating string of pipe 12 in combination with the jarring action of the lower valve will unseat the packer 14 and the device may be removed from the well bore.

While the equalizing control valve assembly has been illustrated for the purpose of disclosure in connection with a rat-hole packer, it is manifest that such assembly may be utilized in connection with a "hook-wall" packer such as shown in Figs. 4 and 5 of Patent No. 2,073,107, issued March 9, 1937, to M. O. Johnston; that is, the type of packing assembly that is manipulated by a J-slot arrangement. Inasmuch as the elements 44 and 74 are splined and interfit with the keyways 46 and 76, relative rotation between the mandrels and the bodies of the valve assembly is prevented. Of course, if desired, in using a rat-hole packer as illustrated here, the splines may be omitted. However, it is preferable to have a valve assembly which may be utilized either with a bottom hole packer or a packer which may be set at any desired location in a well bore.

Many changes may be made in the details of the assembly illustrated and, if desired, the pistons may be covered with a suitable sheath, such as rubber and the like and may be of any conventional configuration in which rapid movement is permissible in one direction and measured movement is obtained in the opposite direction. Morever, the splines may be advantageously placed in other parts of the tool and the tool may be changed considerably in its details. It should be noted that the mandrels have been described as continuous elements; however, for ease of assembly, the mandrels may be made up of several threaded elements, as illustrated in the drawings.

*While the control or upper valve assembly 20 and the equalizing or lower valve assembly 22 are particularly advantageous when used together; obviously, the valve assemblies may be used with other types of control or equalizing valve assemblies as well as for other purposes which will suggest themselves to those skilled in the art.*

It seems manifest that this testing tool eliminates many valves of conventional tools, such as the disk valve, main valve seats and springs on the main valves and the conventional shut-in valves. This permits of compactness of construction which is not otherwise permissible in conventional testing tools. Morever, the operation of the tool insures against fouling of the tool and resultant misleading indications to the operators, erroneous conclusions or loss of the test altogether.

While only one embodiment of the invention is shown and described herein, it is obvious that various changes and uses may be made without departing from the spirit of the invention or the scope of the annexed claims.

I claim:

1. A valve assembly adapted for use with a formation tester and adapted to be secured to a string of pipe for lowering into a well bore comprising, in combination, a first valve including a first piston chamber, a first mandrel having an internal passage closed at its lower end slidably extending into the piston chamber and adapted to be secured to and in fluid communication with the interior of the string of pipe, a first piston on the mandrel slidably disposed in the first piston chamber, a closed run-out chamber connected to the piston chamber, a first stuffing box between the run-out chamber and the first piston chamber, the lower portion of the first mandrel being slidably disposed in the stuffing box when the first mandrel is in elevated position, ports on the lower portion of the first mandrel establishing fluid communication of the run-out chamber with the internal passage of the first mandrel, said ports being disposed in the stuffing box when the first mandrel is elevated whereby the first valve is closed when the first mandrel is elevated, and a second valve including a second mandrel provided with an internal passage throughout its length and in fluid communication with and extending from the run-out chamber, a second piston chamber, said second mandrel slidably extending into said second piston chamber, a second piston on the second mandrel slidably disposed in the second piston chamber, a second stuffing box in the upper end of the second piston chamber, ports in the second mandrel permitting fluid circulation through the second mandrel and said last-mentioned ports, said last-mentioned ports disposed above the second stuffing box when the second mandrel is in elevated position whereby the second valve is open when the second mandrel is elevated, hydraulic fluid in each piston chamber, said first and second valves including means operable in each of said piston chambers for providing relatively slow downward movement of said first mandrel and fast downward movement of said second mandrel and relatively fast upward movement of the first mandrel and slow upward movement of the second mandrel whereby downward movement of the first and second mandrels moves the ports of the second mandrel into the second stuffing box before moving the ports of the first mandrel out of the first stuffing box thereby closing the second valve before opening the first valve, and whereby upward movement of the mandrels moves the ports of the first mandrel into the first stuffing box before moving the ports of the second mandrel out of the second stuffing box thereby closing the first valve for a predetermined time interval before opening the second valve.

2. An equalizing and control valve assembly adapted for use with a formation tester for testing oil wells and the like and adapted to be secured to a string of pipe for lowering into an oil well comprising, in combination, a first valve including a first piston chamber, a first mandrel having an internal passage closed at its lower end slidably extending into the piston chamber and adapted to be secured to and in fluid communication with the interior of the string of pipe, a first piston on the mandrel slidably disposed in the first piston chamber, a closed run-out chamber connected to the piston chamber, a first stuffing box between the run-out chamber and the first piston chamber, the lower portion of the first mandrel being slidably disposed in the stuffing box when the first mandrel is in elevated position, ports on the lower portion of the first mandrel establishing fluid communication of the run-out chamber with the internal passage of the first mandrel, said ports being disposed in the stuffing box when the first mandrel is elevated whereby the first valve is closed when the first mandrel is elevated, and a second valve including a second mandrel having an internal passage throughout its length and in fluid communication with and extending from the run-out chamber, a second piston chamber, said second mandrel slidably extending into said second piston chamber, a second piston secured to and slidably disposed in the second piston chamber, a second stuffing box in the upper end of the second piston chamber, ports in the second mandrel permitting circulation of fluid through the second mandrel and the last-mentioned ports, said last-mentioned ports disposed above the second stuffing box when the second mandrel is in elevated position whereby the second valve is open when the second mandrel is elevated, hydraulic fluid in each piston chamber, and means mounted on the first and second mandrels and operable in the first and second piston chambers for providing relatively slow downward movement of said first mandrel and fast downward movement of said second mandrel and relatively fast upward movement of the first mandrel and slow upward movement of the second mandrel whereby downward movement of the first and second mandrels moves the ports in the second mandrel into the second stuffing box before moving the ports of the first mandrel out of the first stuffing box thereby closing the second valve before opening the first valve, and whereby upward movement of the mandrels moves the ports in the first mandrel into the first stuffing box before moving the ports of the second mandrel out of the second stuffing box thereby closing the first valve for a predetermined time interval before opening the second valve.

3. An equalizing and control valve assembly adapted for use with a formation tester for testing oil wells and the like and adapted to be secured to a string of pipe for lowering into an oil well comprising, in combination, an upper valve including an upper piston chamber, an upper mandrel having an internal passage closed at its lower end slidably extending into the upper piston chamber and adapted to be secured to and in fluid communication with the interior of the string of pipe, an upper piston on the mandrel slidably disposed in the upper piston chamber, a closed run-out chamber, an upper stuffing box connecting the closed run-out chamber to the lower portion of the upper piston chamber, the lower portion of the upper mandrel being slidably disposed in the upper stuffing box when the upper mandrel is in elevated position, ports on the lower portion of the upper mandrel establishing fluid communication of the run-out chamber with the passage in the upper mandrel, said ports being disposed in the upper stuffing box when the upper mandrel is elevated whereby the upper valve is closed when the upper mandrel is elevated, and a lower valve including a lower mandrel provided with a passage throughout its length and in fluid communication with and extending from the run-out chamber, a lower piston chamber, said lower mandrel slidably extending into said lower piston chamber, a lower piston secured to the mandrel and slidably disposed in the lower piston chamber, a lower stuffing box in the upper end of the lower piston chamber, ports in the lower mandrel permitting circulation of fluid through the lower mandrel and the last-mentioned ports, said last-mentioned ports disposed above the lower stuffing box when the lower mandrel is in elevated position whereby the lower valve is open when the lower mandrel is in elevated position, hydraulic fluid in each piston chamber, choke means in each piston for permitting hydraulic fluid to pass therethrough, and by-pass means associated with each of said pistons and piston chambers whereby hydraulic fluid by passes the lower piston when moving downwardly thereby providing faster downward movement of said lower mandrel than that of said upper mandrel and hydraulic fluid bypasses the upper piston when moving upwardly thereby providing more rapid upward movement of the upper mandrel than that of said lower mandrel whereby said lower valve closes before said upper valve opens on downward movement of said mandrels and said upper valve closes for a predetermined time interval before said lower valve opens on upward movement of said mandrels.

4. The equalizing and control valve assembly of claim 3 where the by-pass means comprises a valve in each piston, the valve in the upper piston adapted to be closed on downward movement and open on upward movement of said upper piston, and the valve in the lower piston adapted to open on downward movement and close on upward movement of said lower piston.

5. The equalizing and control valve assembly of claim 3 where the by-pass means comprises upwardly-tapering sides on the upper piston and downwardly-tapering sides on the lower piston, each said piston formed of resilient material whereby downward movement of said first piston and upward movement of said second piston expands said pistons and thereby provides relatively slow downward and upward movement, respectively, and upward movement of the upper piston and downward movement of the lower piston compresses said pistons thereby permitting relatively fast upward movement of said upper piston and downward movement of said lower piston.

6. The equalizing and control valve assembly of claim 3 including additional by pass means disposed proximate the upper end of the lower piston chamber adapted to permit rapid passage of hydraulic fluid about the lower piston whereby said lower piston moves upwardly at a relatively slow rate until reaching said second by-pass means where it is rapidly accelerated thereby imparting a jarring action to the lower piston chamber.

7. The equalizing and control valve assembly of claim 3 including spring means at the lower end of the upper piston chamber to resiliently urge the upper piston upwardly.

8. The equalizing and control valve assembly of claim 3 including means to prevent relative rotation between each of said mandrels and said piston chambers.

9. A valve assembly adapted for use with a formation tester and adapted to be secured to a string of pipe for lowering into a well bore comprising, in combination, an upper control valve, said control valve including a first piston chamber, a first mandrel provided with an internal passage closed at its lower end extending downwardly into the upper end of and suspending the piston chamber and adapted to be secured to and in fluid communication with the interior of the string of pipe, a first piston on the mandrel slidably disposed in the first piston chamber, a closed run-out chamber, a first stuffing box connecting the run-out chamber to the lower end of the first piston chamber, the lower portion of the first mandrel being slidably disposed in the stuffing box when the first mandrel is in elevated position, ports on the lower portion of the first mandrel establishing fluid communication of the run-out chamber with the passage in the first mandrel, said ports disposed in the stuffing box when the first mandrel is elevated whereby the control valve normally is closed when lowering or raising the valve assembly, and a lower equalizing valve including a second mandrel provided with an internal passage in fluid communication with the interior of and extending from the lower portion of the run-out chamber, a second piston chamber, said second mandrel slidably extending through and suspending said second piston chamber, a second piston secured to and slidable in the second piston chamber, a second stuffing box in the upper end of the second piston chamber, and ports in the second mandrel above the second stuffing box when the second mandrel is in elevated position but adapted to move into the stuffing box when the second mandrel is in lowered position whereby the equalizing valve normally is open thereby permitting circulation of fluid through the second mandrel and said last-mentioned ports when lowering or raising the valve assembly into or from the well bore, hydraulic fluid in each piston chamber, and means mounted on the first and second mandrels operable in each piston chamber whereby hydraulic fluid flows past the lower piston faster than the upper piston on the downstroke of the mandrels and flows by the upper piston faster than the lower piston on the upstroke of the mandrels thereby closing the circulating valve before opening the control valve on downward movement of said mandrels and closing the control valve for a predetermined time interval before opening the circulating valve on upward movement of said mandrels.

10. The valve assembly of claim 9 including by-pass means disposed proximate the upper end of the second piston chamber for bypassing hydraulic fluid about said second piston whereby said second piston moves upwardly at a relatively slow rate until reaching said bypass means where it is accelerated rapidly thereby imparting a jarring action to the second piston chamber.

*11. A valve assembly adapted for use with a formation tester adapted to be secured to a string of pipe for lowering into a well bore comprising, in combination, an upper main valve including a body having a piston chamber provided with passages at each end, a first mandrel having an internal passage closed adjacent its lower end slidably extending into said passages and through the piston chamber adapted to be secured to and in fluid communication with the interior of the string of pipe, the lower portion of the first mandrel being extendable below the lower of the passages when the mandrel is in a lowered position, packing means packing off the first mandrel in each of said passages, one or more ports in said lower portion of the first mandrel in fluid communication with the internal passage in the first mandrel, said ports being positioned in the lower of the packing means when the first mandrel is in an elevated position and below the lower of the packing means when the first mandrel is in said lowered position whereby the main valve is closed and opened when the first mandrel is in said elevated position and said lowered position, respectively, hydraulic fluid in the piston chamber, means including a piston mounted on the first mandrel and operable in the piston chamber whereby the hydraulic fluid flows past the piston relatively slow on the downstroke and relatively fast on the upstroke of the first mandrel, a run-out chamber connected to the lower end of said body, and an equalizing valve, said equalizing valve including a second body provided with a passage, second packing means disposed in the last-mentioned passage, a second mandrel having an internal passage connected to the lower end of the run-out chamber, and one or more ports in the second mandrel above the stuffing box when the second mandrel is in elevated position but adapted to move into the stuffing box when the second mandrel is in a lowered position whereby the equalizing valve normally is open and whereby on downward movement of said mandrels said equalizing valve closes before said main valve is opened.*

*12. A valve assembly adapted for use with a formation tester and adapted to be secured to a string of pipe for lowering into a well bore comprising, in combination, an upper main valve including a first body provided with a passage therethrough, a first mandrel provided with an internal passage extending downwardly into said passage in said body and adapted to be secured to and in fluid communication with the interior of the string of pipe, a closed run-out chamber disposed at the lower end of said body, the lower portion of the first mandrel being slidable in the closed run-out chamber, a valve closing said passage when said first mandrel is in elevated position and operable to open said passage to said run out chamber when the first mandrel is in lowered position, and an equalizing valve including a second body including a piston chamber provided with passages at each end, a second mandrel having an internal passage slidably extending through said passages and the piston chamber, said second mandrel in fluid communication with the interior of and extending from the lower portion of the run-out chamber, a stuffing box at the upper end of the piston chamber, one or more ports in the second mandrel above the stuffing box when the second mandrel is in elevated position but adapted to move into the stuffing box when the second mandrel is in lowered position whereby the equalizing valve normally is open thereby permitting circulation of fluid through the second mandrel and said ports when lowering or raising the valve assembly into or from the well bore, hydraulic fluid in said piston chamber, and means mounted on the second mandrel operable in said piston chamber so that hydraulic fluid flows past the piston faster on the downstroke of the second mandrel than on its upstroke whereby the equalizing valve closes after the main valve on upward movement of the mandrels.*

*13. The valve assembly of claim 12 including bypass means disposed proximate the upper end of the piston chamber for bypassing hydraulic fluid about said piston whereby said piston moves upwardly at a relatively slow rate until reaching said bypass means where it is acceler-*

*ated rapidly thereby imparting a jarring action to the piston chamber.*

References Cited in the file of this patent or the original patent

UNITED STATES PATENTS

| | | |
|---|---|---|
| 2,073,107 | Johnston | Mar. 9, 1937 |
| 2,129,216 | Johnston | Sept. 6, 1938 |
| 2,189,103 | Dripps et al. | Feb. 6, 1940 |
| 2,265,431 | Kerr | Dec. 9, 1941 |
| 2,288,780 | Bradner | July 7, 1942 |
| 2,309,872 | Shaffer et al. | Feb. 2, 1943 |
| 2,499,695 | Storm | Mar. 7, 1950 |
| 2,567,321 | Courter | Sept. 11, 1951 |
| 2,646,127 | Breukelman | July 21, 1953 |